(12) United States Patent  
Lavoie

(10) Patent No.: US 7,073,862 B2  
(45) Date of Patent: Jul. 11, 2006

(54) TUMBLE SEAT ASSEMBLY HAVING LOCKING STRUT

(75) Inventor: Scott Lavoie, Red Oak, IA (US)

(73) Assignee: Intier Automotive Inc., Newmarket (CA)

( * ) Notice: Subject to any disclaimer, the term of this patent is extended or adjusted under 35 U.S.C. 154(b) by 68 days.

(21) Appl. No.: 10/631,085

(22) Filed: Jul. 31, 2003

(65) Prior Publication Data

US 2005/0023857 A1 Feb. 3, 2005

(51) Int. Cl.
*B60N 2/30* (2006.01)
*B60N 2/04* (2006.01)

(52) U.S. Cl. .......................... 297/378.13; 297/378.14; 297/331; 297/336; 296/65.03; 296/65.05; 296/65.09

(58) Field of Classification Search ........... 297/378.13, 297/378.14, 336, 331; 296/65.05, 65.09, 296/65.03
See application file for complete search history.

(56) References Cited

U.S. PATENT DOCUMENTS

| 2,565,666 | A | | 8/1951 | Schaefer | |
|---|---|---|---|---|---|
| 4,636,003 | A | * | 1/1987 | Siebler | 297/336 |
| 4,695,094 | A | * | 9/1987 | Siebler | 297/331 |
| 4,720,143 | A | | 1/1988 | Schwartz et al. | |
| 4,884,843 | A | * | 12/1989 | DeRees | 297/331 |
| 4,925,229 | A | * | 5/1990 | Siebler | 296/65.09 |
| 5,634,686 | A | * | 6/1997 | Okazaki | 297/336 |
| 5,662,368 | A | * | 9/1997 | Ito et al. | 296/65.05 |
| 5,743,596 | A | * | 4/1998 | Chabanne | 297/463.1 |
| 5,765,894 | A | * | 6/1998 | Okazaki et al. | 296/65.03 |
| 6,000,742 | A | * | 12/1999 | Schaefer et al. | 296/65.09 |
| 6,244,649 | B1 | * | 6/2001 | Scheck et al. | 296/65.03 |
| 6,334,643 | B1 | * | 1/2002 | Lindblad et al. | 296/65.09 |
| 6,361,098 | B1 | * | 3/2002 | Pesta et al. | 296/65.03 |
| 6,375,246 | B1 | * | 4/2002 | Nicola et al. | 296/65.03 |
| 6,375,255 | B1 | * | 4/2002 | Maruta et al. | 297/15 |
| 6,382,491 | B1 | | 5/2002 | Hauser et al. | |
| 6,394,525 | B1 | | 5/2002 | Seibold | |
| 6,478,358 | B1 | | 11/2002 | Okazaki et al. | |
| 6,520,581 | B1 | | 2/2003 | Tame | |
| 6,523,899 | B1 | | 2/2003 | Tame | |
| 6,655,738 | B1 | * | 12/2003 | Kammerer | 297/331 |

* cited by examiner

*Primary Examiner*—Rodney B. White
(74) *Attorney, Agent, or Firm*—Clark Hill PLC

(57) ABSTRACT

A seat assembly is adapted to be mounted along a floor of a motor vehicle. The seat assembly includes a seat cushion frame having a forward end and a rearward end for supporting an occupant on the seat assembly. The seat assembly also includes a front support structure pivotally coupled to the forward end of the seat cushion frame. The front support structure pivots the seat assembly between a generally horizontal seating position and a generally upright tumbled position. In addition, the seat assembly includes a locking strut extending between a first end, which is coupled to the front support structure, and an opposite second end, which is coupled to the rearward end of the seat cushion frame. The locking strut locks and retains the seat assembly in any location between the seating position and the tumbled position in response to an acceleration force exerted on the seat assembly above a predetermined threshold. As a result, inadvertent pivoting of the seat assembly towards the seating position is prevented.

12 Claims, 4 Drawing Sheets

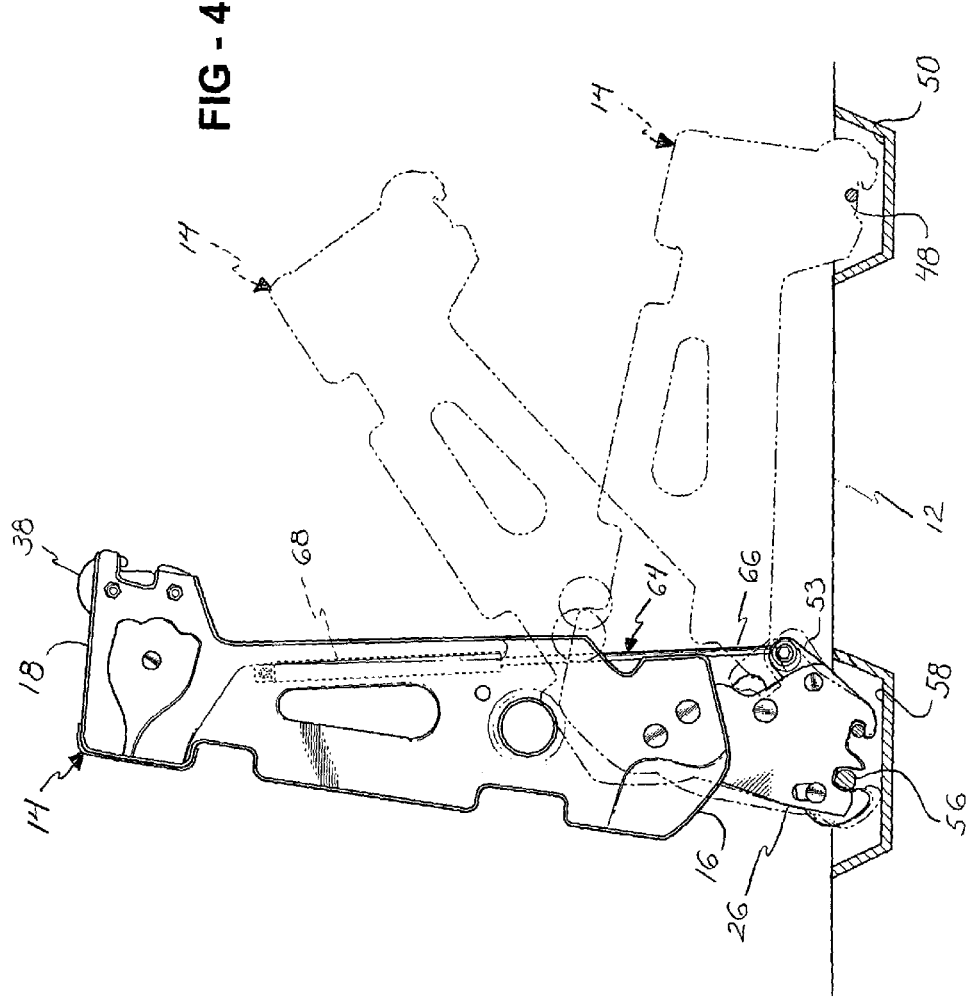

TUMBLE SEAT ASSEMBLY HAVING LOCKING STRUT

BACKGROUND OF THE INVENTION

1. Field of the Invention

This invention relates to a seat assembly for a motor vehicle. More particularly, the invention relates to a seat assembly including a locking strut that locks the seat assembly in any location between a generally horizontal seating position and a generally upright tumbled position.

2. Description of Related Art

A motor vehicle typically includes front and rear seat assemblies within a passenger compartment for supporting occupants. There are, however, times when a user will desire that the space occupied by one or more of the seat assemblies be utilized as storage space. For this reason, so-called fold and tumble seats have been developed to provide the user with additional storage space along a floor of the motor vehicle.

In a typical fold and tumble seat, a seat back of the seat assembly is first folded against a seat cushion. A forward end of the seat cushion is then pivoted relative to the floor to move the seat assembly from a generally horizontal seating position to a generally upright tumbled position. As a result, the space along the floor formerly occupied by the seat assembly is now available for storing items.

Typically, the seat assembly is retained in the upright tumbled position by a locking mechanism. Such locking mechanisms are, however, only operable when the seat assembly is in its upright tumbled position. Thus, when the seat assembly cannot be fully tumbled, as may occur when an object behind an immediately forward seat prevents the seat assembly from fully pivoting, the locking mechanism is not available to lock the seat assembly into place.

In those instances when the seat assembly is not able to be pivoted into its upright tumbled position but the additional storage space along the floor is still desired, the seat assembly is typically pivoted to an intermediate position located between the seating and tumbled positions. In such a position, the locking mechanism is inoperable. As a result, when a predetermined acceleration force is exerted upon the seat assembly during a motor vehicle impact or the like, the seat assembly is prone to inadvertently pivot back to the seating position. Such inadvertent pivoting of the seat assembly can damage objects stored along the floor in the space previously occupied by the seat assembly.

Thus, there is a need for a seat assembly that can be locked in any location between a generally horizontal seating position and a generally upright tumbled position to prevent inadvertent pivoting of the seating assembly towards the seating position.

SUMMARY OF THE INVENTION

A seat assembly is adapted to be mounted along a floor of a motor vehicle. The seat assembly includes a seat cushion frame having a forward end and a rearward end for supporting an occupant on the seat assembly. The seat assembly also includes a front support structure pivotally coupled to the forward end of the seat cushion frame. The front support structure pivots the seat assembly between a generally horizontal seating position and a generally upright tumbled position. In addition, the seat assembly includes a locking strut extending between a first end, which is coupled to the front support structure, and an opposite second end, which is coupled to the rearward end of the seat cushion frame. The locking strut locks and retains the seat assembly in any location between the seating position and the tumbled position in response to an acceleration force exerted on the seat assembly above a predetermined threshold. As a result, inadvertent pivoting of the seat assembly towards the seating position is prevented.

BRIEF DESCRIPTION OF THE DRAWINGS

Advantages of the invention will be readily appreciated as the same becomes better understood by reference to the following detailed description when considered in connection with the accompanying drawings wherein:

FIG. 4 is a side view of the seat assembly in a generally upright tumbled position.

DETAILED DESCRIPTION OF THE PREFERRED EMBODIMENT

Figure 1:
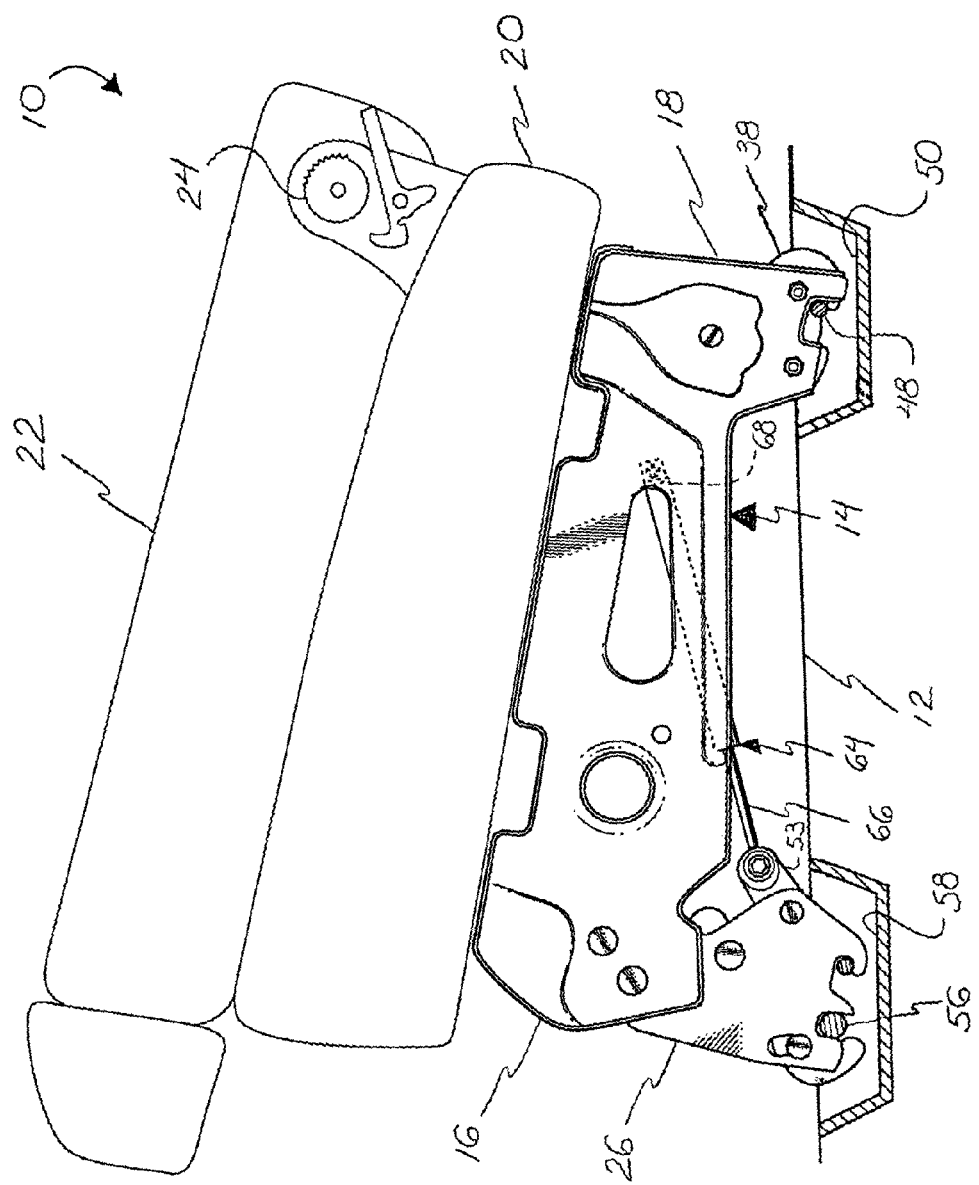
FIG. 1 is a side view of a seat assembly according to the invention in a generally horizontal seating position.

Referring to FIG. 1, a seat assembly, generally shown at 10, according to the invention is adapted to be mounted along a floor 12 of a motor vehicle (not shown). The seat assembly 10 includes a seat cushion frame, generally indicated at 14, extending between a forward end 16 and a rearward end 18. The seat assembly 10 also includes a seat cushion 20 extending along the seat cushion frame 14 for supporting an occupant. A seat back 22 is pivotally secured to the seat cushion 20 by a recliner mechanism 24. It will, however, be appreciated that although the seat back 22 is shown as being pivotally secured to the seat cushion 20, the seat back 22 may instead be pivotally mounted to the seat cushion frame 24 or directly to the floor 12.

The seat assembly 10 is a so-called fold and tumble seat assembly, as is commonly known to those skilled in the art. For pivoting of the seat assembly 10 relative to the floor 12, the seat back 22 is first folded against the seat cushion 20. Next, the seat assembly 10 pivots about at least one front support structure 26 to move from a generally horizontal seating position, shown in FIG. 1, to a generally upright tumbled position, shown in solid lines in FIG. 4. When the seat assembly 10 is in the tumbled position, the space along the floor 12 that has been vacated by the seat assembly 10 is available for storage of items or access behind the seat.

Figure 2:
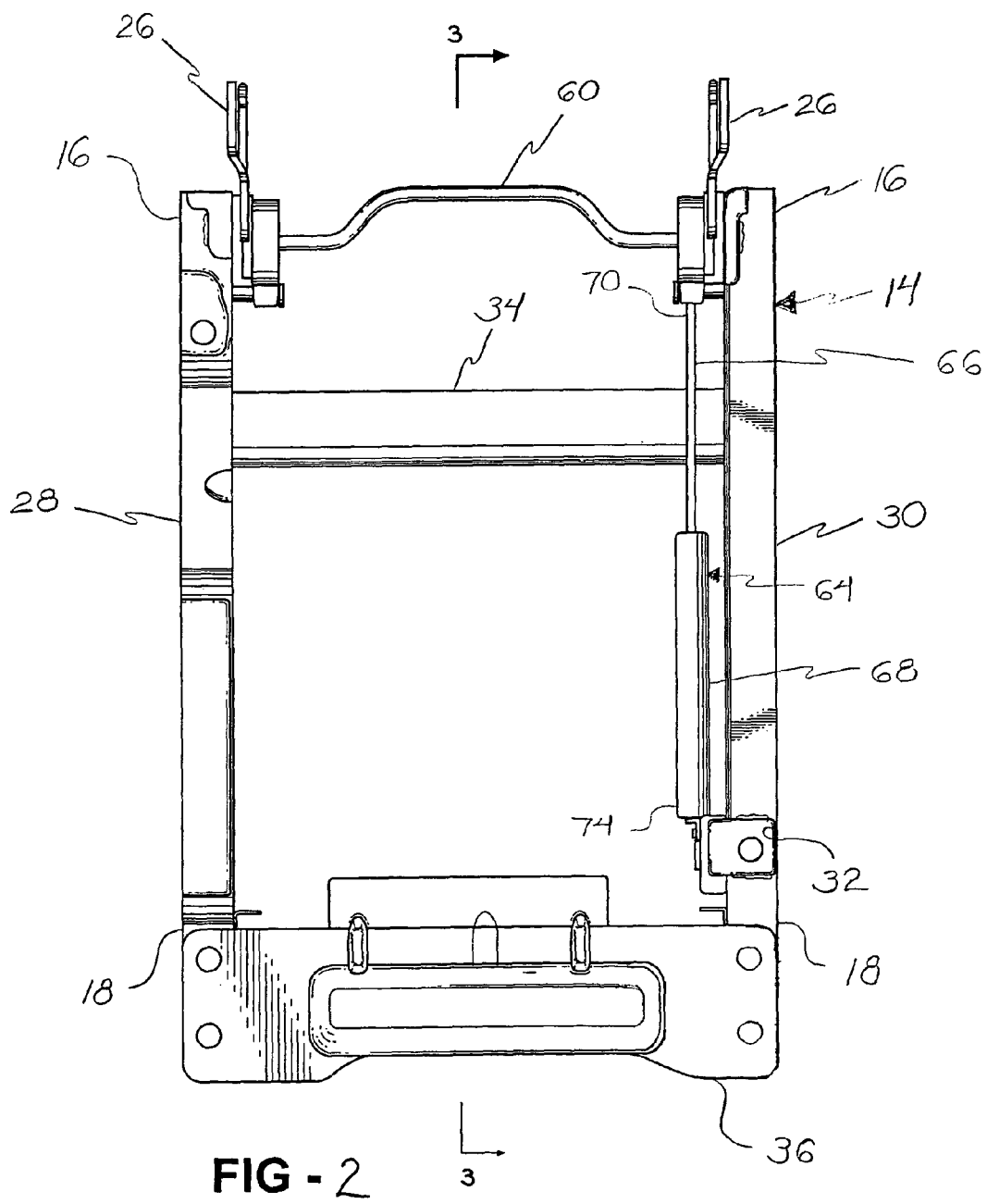
FIG. 2 is a top view of the seat assembly.

Referring to FIG. 2, the seat cushion frame 14 includes spaced apart and parallel first 28 and second 30 seat risers. Each of the seat risers 28, 30 extends between the forward 16 and rearward 18 ends of the seat cushion frame 14. One of the seat risers 30 includes a support bracket 32 fixedly secured thereto and disposed adjacent the rearward end 18 of the seat cushion frame 14. The seat cushion frame 14 also includes front 34 and rear 36 cross members extending between the first 28 and second 30 seat risers for providing additional structural support to the seat assembly 10.

Figure 3:
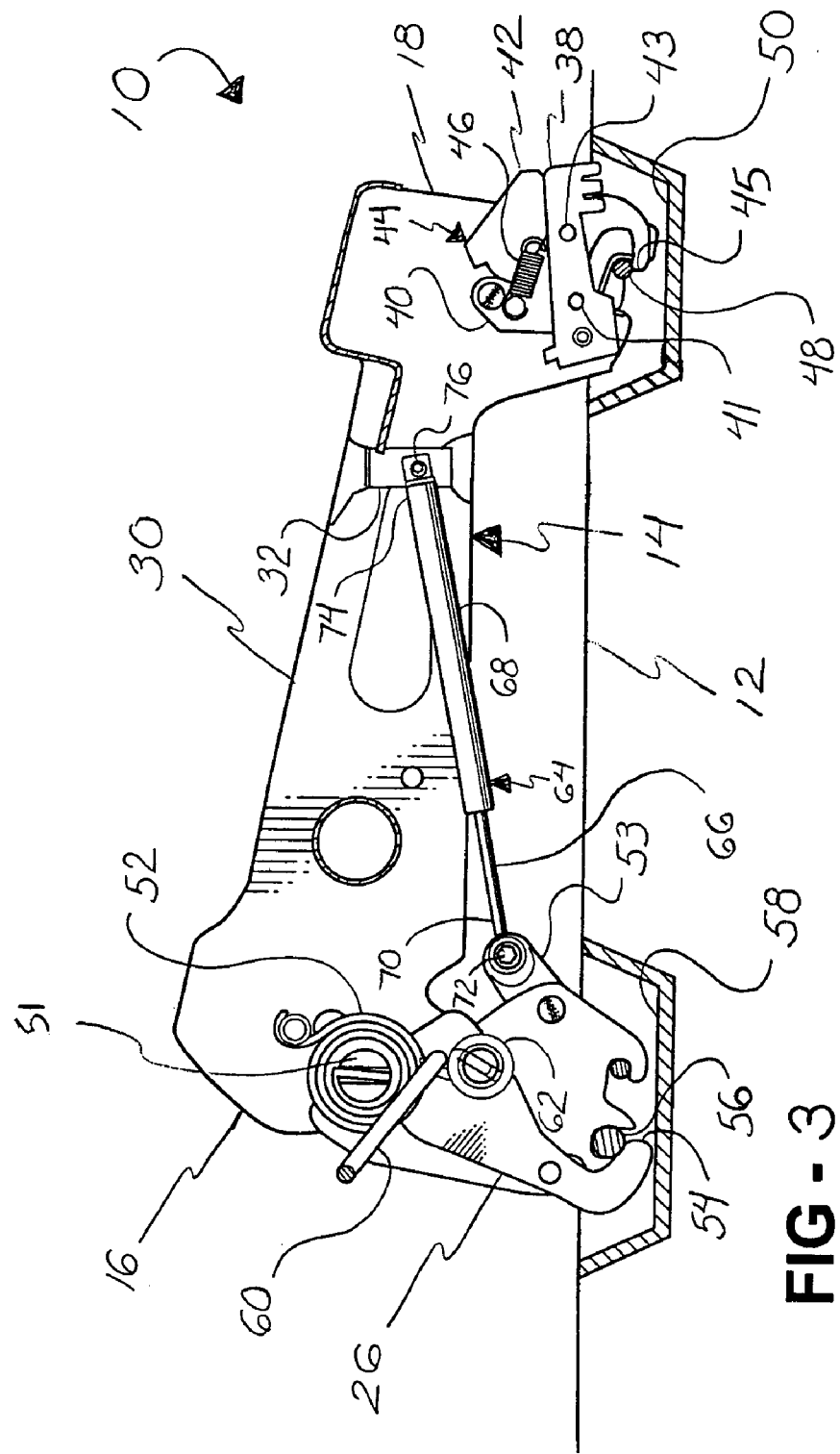
FIG. 3 is a cross-sectional view taken along lines 3—3 in FIG. 2.

Referring to FIG. 3, a rear support structure, generally indicated at 38, is mounted to each of the first 28 and second 30 risers at the rearward end 18 of the seat cushion frame 14. The rear support structure 38 supports the seat assembly 10 when the seat assembly 10 is in the seating position. Each rear support structure 38 includes a rear latch 44 having first 40 and second 42 release legs. The first 40 and second 42 release legs are pivotally secured to each of the first 28 and second 30 seat risers by rivet pins 41, 43, respectively. The rear latch 44 defines a hook 45 at an end of the second release leg 42. The hook 45 engages a rear rod member 48 disposed within a rear floor cavity 50 to retain the seat assembly 10 in the seating position. A torsion spring 46 biases the first 40 and second 42 release legs towards one another to keep the hook 45 engaged to the rear rod member 48. To disengage the hook 45 and the rear rod member 48, the first 40 and second 42 release legs are pivoted in opposite directions from one another thereby allowing the seat assembly 10 to pivot out of the seating position towards the tumbled position.

One of the front support structures 26 is pivotally mounted at 51 to the each of the first 28 and second 30 risers at the forward end 16 of the seat cushion frame 14. Thus, the seat cushion frame 14 pivots about the front support structure 26 to move the seat assembly 10 from the seating position to the tumbled position, as shown in FIG. 4. A circular spring 52 is fixedly secured to each front support structure 26 to bias the seat assembly 10 towards the tumbled position. The front support structure 26 also includes a mounting protruberance 53, further referred to below.

The front support structure 26 further includes a front latch 54 for engaging a forward rod member 56 disposed within a forward floor cavity 58. When the front latch 54 is disengaged from the forward rod member 56, the seat assembly 10 may be completely removed from the motor vehicle to provide additional storage space therewithin. A front release handle 60 selectively disengages the front latch 54 from the forward rod member 56 to completely release the seat assembly 10 from the floor 12. A coil spring 62 is fixedly secured to the front support structure 26 for biasing the front release handle 60 into a non-actuating state.

Referring now to FIGS. 2 and 3, the seat assembly 10 further includes a locking strut, generally indicated at 64, having a piston member 66 slidably received within a cylinder or housing 68. The locking strut 64 controls the rate of movement of the seat assembly 10 as the seat assembly 10 pivots between the seating and tumbled positions. At a first end 70 of the locking strut 64, the piston member 66 is coupled to the mounting protruberance 53 of the front support structure 26 by a first rivet pin 72. At a second end 74 of the locking strut 64, the housing 68 is coupled to the support bracket 32 of the second seat riser 30 by a second rivet pin 76.

Locking struts that are suitable for use with the seat assembly 10 according to the invention are manufactured by Suspa, Inc., Grand Rapids, Michigan, and sold under the trade name SOFTLINE. It is however, contemplated that similar locking struts may be used with the seat assembly 10 without departing from the concept described herein.

The locking strut 64 locks and retains the seat assembly 10 in any location between the seating and tumbled positions in response to an acceleration force exerted on the seat assembly 10 above a predetermined threshold level. In a preferred embodiment, the predetermined acceleration force threshold level that must be exerted on the seat assembly 10 in order to lock the locking strut 64 is approximately 2 gs. It will, however, be appreciated that the precise threshold level for the acceleration force may vary depending on numerous factors, including the type of locking strut, the weight of the seat assembly, the angle of the seat assembly, etc. Further, it is appreciated that the chosen threshold level for the acceleration force should be high enough that manual adjustment of the seat assembly 10 or incidental contact with the seat assembly 10 will not lock the locking strut 64.

The utilization of the locking strut 64 in association with the seat assembly 10 is advantageous in that the seat assembly 10 can be locked and retained in any location between the seating and tumbled positions. This compares favorably to previously utilized structural locking mechanisms, which only lock the seat assembly 10 in place when the seat assembly 10 is in the fully upright tumbled position. The locking strut 64 allows locking and retention of the seat assembly 10 even in those instances in which the seat assembly 10 cannot be fully pivoted into the generally upright, tumbled position, such as when an object is stored behind an immediately forward seat or when the immediately forward seat is positioned in a full rearward position.

Thus, the locking strut 64 prevents inadvertent pivoting of the seat assembly 10 to the seating position. As a result, any objects stored in the space vacated by the seat assembly 10 upon pivoting thereof to the tumbled position will not be damaged when an acceleration force above the predetermined threshold level is exerted on the pivoted seat assembly 10.

The locking strut 64 may also provide a spring-biasing force that is sufficient to move the seat assembly 10 from the generally horizontal seating position to the fully upright tumbled position without manual assistance. The locking strut 64 may be utilized by itself to pivot the seat assembly 10, or, the locking strut 64 may assist the circular spring 52 in pivoting the seat assembly 10 to the tumbled position. Alternatively, and as mentioned above, the circular spring 52 alone may provide the requisite spring-biasing force for pivoting the seat assembly 10 to the tumbled position.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A seat assembly adapted to be mounted to a floor of a motor vehicle, said seat assembly comprising:
    a seat cushion frame having a forward end and a rearward end for supporting an occupant on said seat assembly;
    a front support structure pivotally coupled to said forward end of said seat cushion frame for pivoting said seat assembly between a generally horizontal seating position and a generally upright tumbled position;
    a locking strut extending between a first end coupled to said front support structure and an opposite second end coupled to said rearward end of said seat cushion frame for locking and retaining said seat assembly in any location between said seating position and said tumbled position in response to an acceleration force exerted on said seat assembly above a predetermined threshold thereby preventing inadvertent pivoting of said seat assembly towards said seating position; and
    said front support structure including a circular spring fixedly secured thereto, said circular spring biasing said seat assembly towards said tumbled position.

2. A seat assembly as set forth in claim 1 wherein said front support structure includes a mounting protruberance for receiving said first end of said locking strut.

3. A seat assembly as set forth in claim 2 including a support bracket fixedly secured to said seat cushion frame adjacent said rearward end thereof for supporting said second end of said locking strut.

4. A seat assembly as set forth in claim 3 including a rear support structure fixedly secured to said seat cushion frame at said rearward end thereof for supporting said seat assembly when said seat assembly is in said seating position.

5. A seat assembly as set forth in claim 4 including a seat back pivotally secured to said seat cushion.

6. A seat assembly as set forth in claim 5 wherein said seat cushion frame includes a seat riser having spaced apart and parallel first and second seat riser members.

7. A seat assembly adapted to be mounted to a floor of a motor vehicle, said seat assembly comprising:

a seat cushion frame having a forward end and a rearward end for supporting an occupant on said seat assembly;

a front support structure pivotally coupled to said forward end of said seat cushion frame for pivoting said seat assembly between a generally horizontal seating position and a generally upright tumbled position;

a locking strut extending between a first end coupled to said front support structure and an opposite second end coupled to said rearward end of said seat cushion frame for pivoting said seat assembly about said front support structure to said tumbled position, said locking strut locking and retaining said seat assembly in any location between said seating position and said tumbled position in response to an acceleration force exerted on said seat assembly above a predetermined threshold thereby preventing inadvertent pivoting of said seat assembly towards said seating position; and said front support structure including a circular spring fixedly secured thereto, said circular spring assisting said locking strut in pivoting said seat assembly towards said tumbled position.

8. A seat assembly as set forth in claim 7 wherein said front support structure includes a mounting protruberance for receiving said first end of said locking strut.

9. A seat assembly as set forth in claim 8 including a support bracket fixedly secured to said seat cushion frame adjacent said rearward end thereof for supporting said second end of said locking strut.

10. A seat assembly as set forth in claim 9 including a rear support structure fixedly secured to said seat cushion frame at said rearward end thereof for supporting said seat assembly when said seat assembly is in said seating position.

11. A seat assembly as set forth in claim 10 including a seat back pivotally secured to said seat cushion.

12. A seat assembly as set forth in claim 11 wherein said seat cushion frame includes a seat riser having spaced apart and parallel first and second seat riser members.

* * * * *